ELECTRON FLOW DEVICE
Original Filed Dec. 13, 1955 2 Sheets-Sheet 1
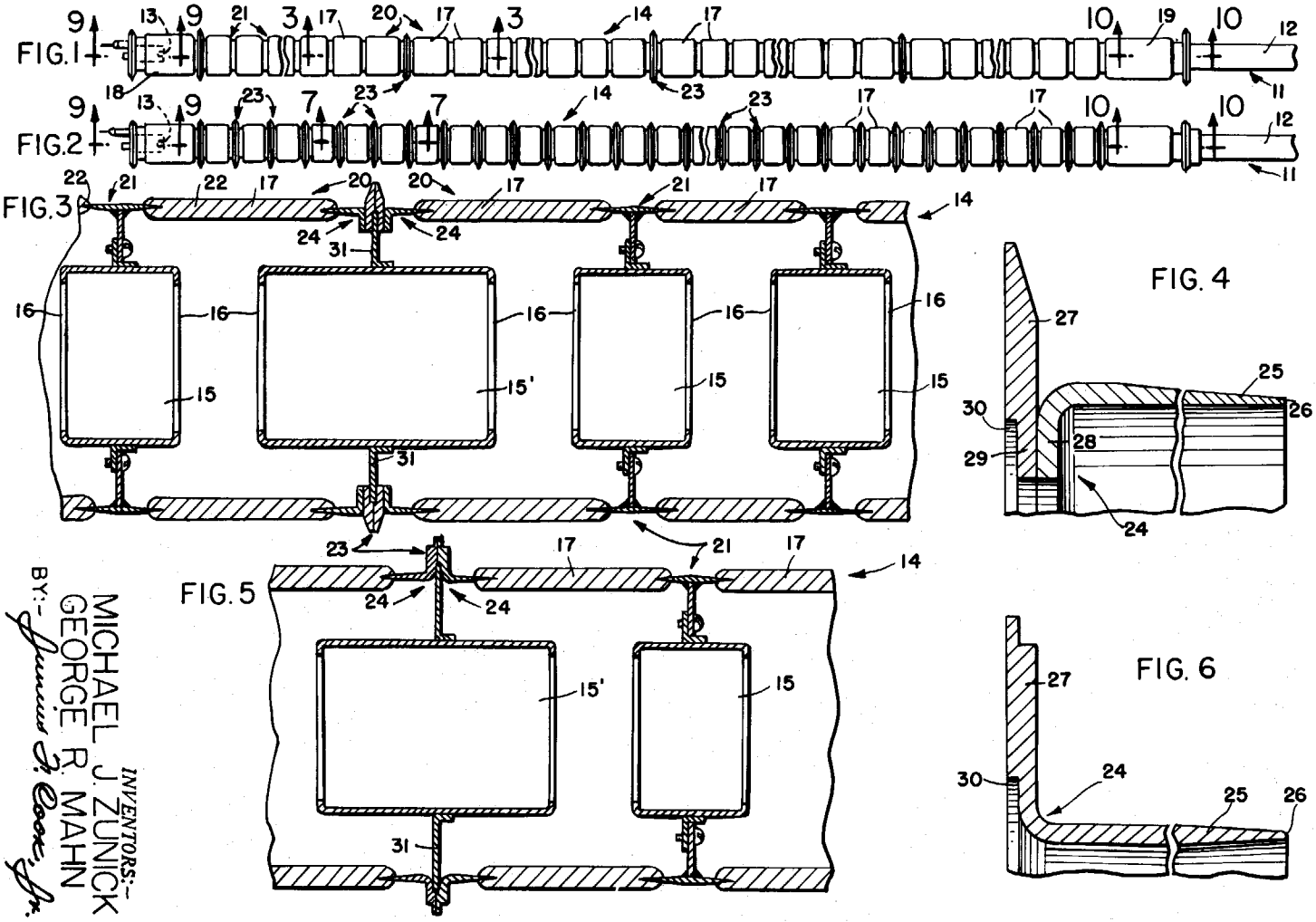
INVENTORS:-
MICHAEL J. ZUNICK
GEORGE R. MAHN
BY:- Junius F. Cook, Jr.
ATTORNEY ELECTRON FLOW DEVICE
Original Filed Dec. 13, 1955 2 Sheets-Sheet 2
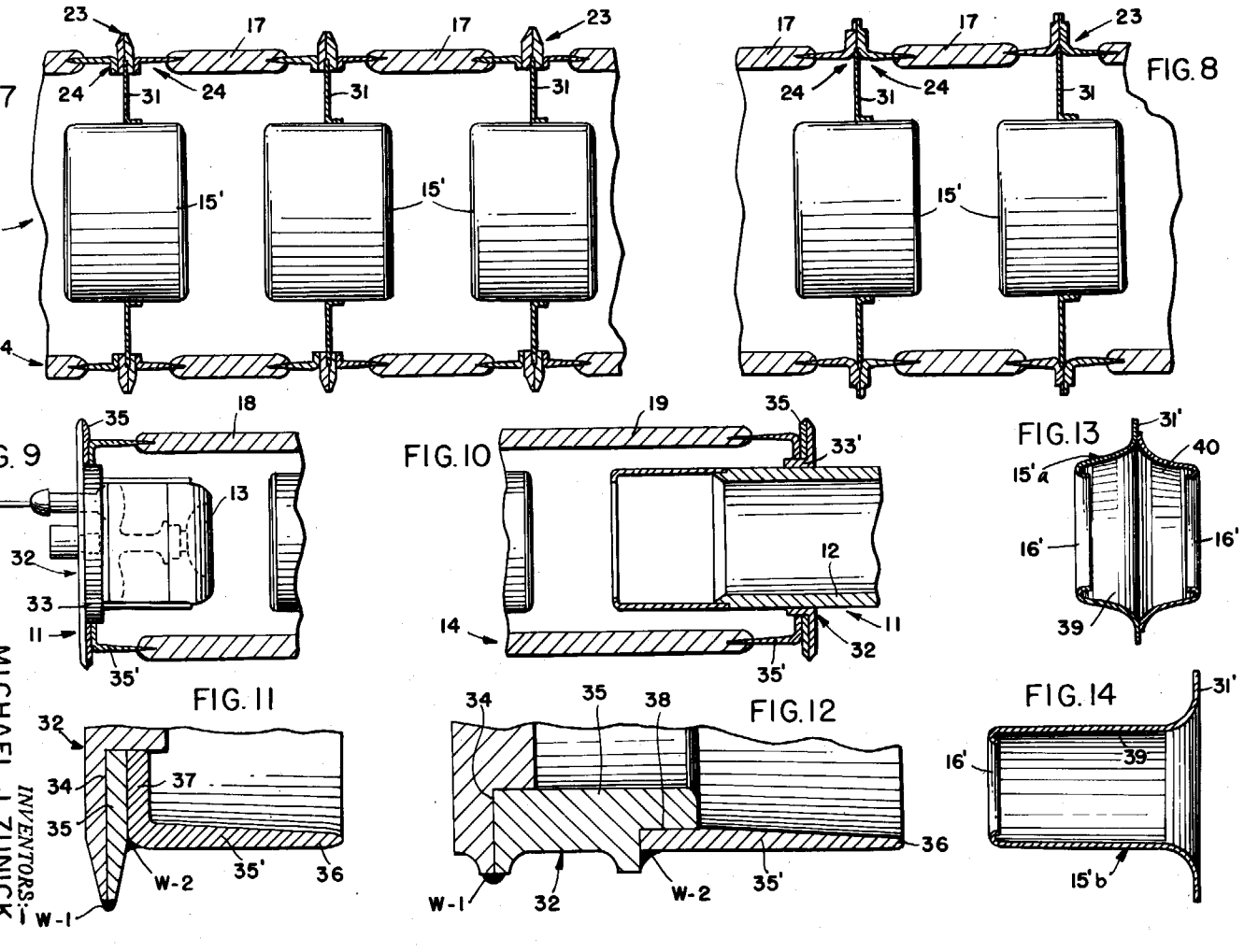
INVENTORS:
MICHAEL J. ZUNICK
GEORGE R. MAHN
BY:- Junius F. Cook, Jr.
ATTORNEY United States Patent Office Re. 25,067
Reissued Oct. 31, 1961

25,067
ELECTRON FLOW DEVICE

Michael J. Zunick, West Allis, and George R. Mahn, Hales Corners, Wis., assignors to General Electric Company, a corporation of New York Original No. 2,923,845, dated Feb. 2, 1960, Ser. No. 552,815, Dec. 13, 1955. Application for reissue Oct. 4, 1960, Ser. No. 60,537
4 Claims. (Cl. 313—82)

Matter enclosed in heavy brackets [ ] appears in the original patent but forms no part of this reissue specification; matter printed in italics indicates the additions made by reissue.

The present invention relates in general to electronics and electron flow devices embodying multiple section envelopes within which electron flow is caused to occur as a result of the operation of the device, the invention having more particular reference to improved multiple section envelopes for electron flow devices and to improved methods of constructing the same.

As suggested in U.S. Letters Patent No. 2,144,518, which issued January 17, 1939, on the invention of W. F. Westendorp in High Voltage Apparatus, electron guiding and accelerating electrodes comprising metal sleeves may be applied in alinement within the envelope between the anode and cathode of electron flow devices, and electrically biased with respect to the cathode at progressively increasing potentials toward the anode in order to guide and to accelerate the motion of electrons in traveling from the cathode toward the anode.

More recently, as taught in U.S. Letters Patent No. 2,336,774, which issued December 14, 1943, on the invention of Howard W. Brackney and Joseph B. Gosling in X-Ray Tube, it has become common, especially in high voltage electron flow devices of the sort herein contemplated, to provide sectional envelopes comprising glass sleeve sections sealingly interconnected in end-to-end abutting relationship by means of seal rings of metal sealable with glass, and to employ such seal rings for the support of guiding and eccelerating electrodes within the envelope and the application of desired operating potential thereon from a potential source outwardly of the envelope. Fabrication of an electron flow device of the sort shown in U.S. Letters Patent No. 2,336,774 involves first the construction of a sectional envelope by the sealing together in end-to-end relationship of a desired number of glass envelope sections, after which the acceleration electrodes may be assembled each upon its corresponding envelope section seal ring, by successively applying the electrodes into the end of the fabricated envelope and moving each electrode thence to its corresponding seal ring, after moving the electrode through all of the intervening seal rings between the end of the fabricated envelope and the seal ring upon which it is to be mounted. Finally, the anode and cathode structures may be applied to and sealed upon the opposite ends of the sectional envelope. There is a limit to the length of envelope that may be incorporated in electron flow devices, constructed in the manner disclosed in U.S. Letters Patent No. 2,336,774, such limit being determined by the distance from the end of the sectional envelope at which an electrode may be successfully applied and secured on its supporting seal ring.

An important object of the present invention is to provide an improved, simplified and highly expeditious method of making electron flow devices of the character mentioned having sectional envelopes of any required length, without limitation on account of the necessity of mounting electrodes on seal rings; a further object being to provide for the mounting of electron guiding and accelerating electrodes within the sectional envelope of an electron flow device during fabrication thereof and as a part of the process of sealing the envelope sections together in end-to-end relationship.

Another important object is to provide an improved seal forming structure whereby to facilitate the sealing together in end-to-end relationship of the envelope sections of electron flow devices, such improved seal forming means serving also to aline an electron guiding and accelerating electrode with respect to the envelope sections to be sealed and to secure such electrode on and as integral part of the seal.

Another important object of the present invention is to provide for the construction of sectional envelopes of the character mentioned in fashion permitting the construction of envelopes of any desired length.

Another important object of the present invention is to provide for the construction of sectional envelopes of the character described, which comprises pre-forming the facing ends of adjacent envelope sections with seal rings forming glass-to-metal seals with said glass sections, and outstanding peripheral rims, whereby said sections may be sealed together in end abutting alinement by peripherally sealing the rims of said seal rings; a further object being to pre-form, as standard assembly units, any desired number of glass envelope sections comprising open ended sleeves, each section having a pair of seal rings forming an annular glass-to-metal seal, one at each of the opposite ends of the section, each of said seal rings having an outstanding peripheral rim, whereby any desired number of said sections may be sealed together in end abutting alinement by peripherally sealing the rims of said seal rings; a still further object being to form the rims of said seal rings each with a seat adapted to interfittingly receive an edge of an outstanding electrode mounting bracket, whereby an electrode carrying bracket may be assembled between the rims of a cooperating pair of envelope section mounted seal rings, in alined relation with respect to said sections, and secured in such alined relationship as a result of the sealing together of said cooperating rims.

Briefly stated, in accordance with a preferred aspect of the invention, the fabrication of the sectional envelope of an electron flow device may be facilitated by pre-sealing cooperating metal seal rings in the ends of glass envelope sections that are to be sealed together, and by then periphally sealing outstanding facing rims formed on said seal rings; said seal rings, if desired, being provided with facing seats at the rims thereof for the purpose of receiving and securing on said rims, when sealed together, the outstanding mounting portions of a bracket for supporting an electron guiding or accelerating electrode in desired alinement within and with respect to the sealed envelope sections.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings:

FIG. 1 is a side view of a high voltage electron flow device embodying the present invention;

FIG. 2 is a side view of a modified form of electron flow device embodying the present invention;

FIG. 3 is an enlarged sectional view taken substantially along the line 3—3 in FIG. 1;

FIG. 4 is a greatly enlarged sectional view of a seal ring component of the structure illustrated in FIG. 3;

FIG. 5 is an enlarged sectional view like FIG. 3, showing a modified construction;

FIG. 6 is a greatly enlarged sectional view of a seal ring component of the sort employed in the structure illustrated in FIG. 5;

FIG. 7 is an enlarged sectional view taken substantially along the line 7—7 in FIG. 2, showing use of a seal ring component of the sort illustrated in FIG. 4;

FIG. 8 is an enlarged sectional view similar to FIG. 7, showing the use of a seal ring component of the sort illustrated in FIG. 6;

FIGS. 9 and 10 are enlarged sectional views taken substantially along the lines 9—9 and 10—10 in FIGS. 1 and 2;

FIGS. 11 and 12 are greatly enlarged sectional views showing end seal structures that may be embodied in the structures depicted in FIGS. 9 and 10; and FIGS. 13 and 14 are sectional views of modified electrode structures that may be employed in place of the electrodes shown in the preceding figures.

To illustrate the invention the drawings show electron flow devices 11 each comprising an anode 12 and a cathode 13 supported in spaced apart, relatively insulated, facing alinement, as by means of an insulating envelope 14 enclosing the cathode and defining an electron flow path between the cathode and the anode. The envelope 14 is preferably of elongated, generally tubular configurations, the cathode being mounted at and within one end of the envelope, and the anode being supported on the envelope at its opposite or cathode remote end. Where the device comprises an electron generator, the outwardly extending portions of the tubular anode element may be fitted with an electron transmitting window for the delivery therethrough of a useful electron beam outwardly of the anode element. If the device, however, be constituted as an X-ray generator, the tubular anode element, at its outwardly extending cathode remote end, may be fitted with an electron target adapted to be constituted as an X-ray source in response to impingement thereon of cathode emitted electrons.

A series of electron guiding and accelerating electrodes 15, comprising metal sleeves forming electronic lenses in end-to-end alinement, may be mounted within the envelope 14 between the anode and cathode. As shown, the electrodes 15 may comprise hollow, cylindrical shells having flanged or beaded edges 16 at the opposite ends thereof, the facing ends of adjacent elements being spaced apart and the beaded or flanged edges serving to create fields of force between adjacent elements for the purpose of retaining electrons against passage radially through the openings between adjacent elements, means being provided to electrically energize the electrodes 15 at progressively increasing potential values away from and with respect to the cathode, whereby electron movement between cathode and anode may be accelerated by the charged electrodes 15, said elements 15 accordingly functioning as electron accelerating as well as guiding electrodes.

The envelope 14 preferably comprises a series of sleeve-like envelope section 17 of insulating material, such as glass, and cathode and anode carrying end sections 18 and 19 of like insulating material, the sections 17, 18 and 19 being secured together in end-to-end abutting relationship by suitable glass-to-metal sealing means.

As shown more particularly in FIGS. 1, 3 and 5, the individual sleeve-like envelope sections 17 may be secured together in groups to form envelope segments 20, each comprising a desired number of sleeve sections 17 secured in end-to-end abutting relationship by means of connecting rings 21 of sleeve-like configuration, having opposite ends forming glass-to-metal seals 22 with the facing ends of adjacent envelope sections 17, electron guiding and accelerating electrodes 15 being assembled and supported upon the connecting rings 21 in the manner described in the aforesaid U.S. Letters Patent No. 2,336,774. Any desired or required number of envelope segments 20 may then be sealed together in end-to-end alinement, by means of an improved sealing procedure utilizing a novel seal structure 23 embodying the present invention, in order to provide a sectional envelope of desired length, such sectional envelope having cathode and anode carrying sections 18 and 19 sealed thereto at the opposite ends thereof in any suitable, preferred or convenient fashion, as by means of sealing rings like the rings 21 or a sealing structure like the structure 23 of the present invention.

Alternately, as shown more especially in FIGS. 2, 7 and 8, individual envelope sections 17 may be interconnected in end-to-end abutting relationship by means of seal structures 23 of the sort embodying the present invention, wherein an electron accelerating and guiding electrode may be secured in each seal structure as and when the same is formed between adjacent envelope sections.

The seal structure 23 of the present invention comprises a pair of preferably indentical ring-like sealing elements 24, of which preferred embodiments are shown in FIGS. 4 and 6, each element of the cooperating pair comprising a sleeve-like portion 25 having a glass sealing edge 26 at one end adapted to seal with an end edge of a glass envelope section 17, each seal element 24 providing an outstanding peripheral flange 27 formed on the sleeve portion 25 at the end thereof remote from the glass sealing edge 26. As shown more especially in FIG. 4, the sleeve portion 25 may be formed with an inwardly turned flange 28 at the end thereof remote from the glass sealing edge 26, and the peripheral flange 27 may comprise a separate ring having an inner edge portion 29 weldingly or brazingly secured and hence sealingly integrated with the inturned flange 28 of the sleeve portion 25. As shown in FIG. 6, however, the outstanding flange 27 may be formed integrally on the sleeve portion 25 at the end thereof remote from the glass sealing edge 26.

In manufacturing a sectional envelope of the sort shown in FIGS. 2, 7 and 8, a ring-like sealing element 24 may be sealed to each of the opposite end edges of the envelope sections 17. The elements 24 may be thus sealingly applied to the sections 17 in suitable jigs to obtain uniformity of alinement and spacement of the outstanding flanges 27 on each section 17, so that each section with attached sealing elements 24 may comprise a standard assembly unit.

An envelope of the sort shown in FIGS. 2, 7 and 8, containing any desired number of assembly units, may be fabricated by stacking assembly units and electrode components 15' successively in a suitable jig or support structure, with the outstanding flanges 27 at the abutting ends of adjacent envelope sections in overlying contact, and by then weldingly connecting said overlying flanges in fashion peripherally sealing the same hermetically together. Each sealing element 24 is preferably provided with an annular seat 30 in the inner portions of and concentric with respect to the flange 27, in position to face the corresponding seat of an overlying flange to thereby form a peripheral pocket for the clamping reception of the outwardly extending edge portions of a mounting bracket 31 formed on and extending outwardly of an electron guiding and accelerating electrode, which it may be desired to secure in the seal structure 23.

Accordingly, an assembly unit comprising an envelope section 17 with seal elements 24 mounted at each end thereof may be supported in suitable carrying means to present a flange 27 at one end of the unit in upwardly facing position. An electrode 15' secured in an outwardly extending mounting bracket 31 may then be assembled on the upwardly facing flange 27 with the outstanding portions of the bracket 31 extending in the seat 30 of the flange, to thereby precisely secure the mounted electrode 15' in coaxial alinement with respect to the assembly unit. Thereupon, another assembly unit may be disposed with the flange 27 of one of its sealing elements 24 in position overlying and supported by the upwardly facing flange of the previously mounted unit, thereby securing the marginal portions of the electrode support bracket 31 in the pocket formed by the facing seats 30 of the so engaged flanges 27. If desired, the engaging flanges may be temporarily clamped together and then peripherally welded to sealingly integrate the same. After a pair of sectional envelope units have thus been sealed in end-to-end relationship, successive units may be sealed in place upon previously assembled units in order to produce an envelope comprising any required number of units with electrodes mounted on the seal structures, as desired.

From the foregoing it will be obvious that envelope segments 20, each comprising any desired number of interconnected sleeve sections 17, may be joined in end-to-end relationship by means of seal structures 23 of the sort described supra, by sealing the edge 26 of a seal element 24 with the glass end edges of envelope segments 20 to be joined together, and thereafter peripherally sealing the flanges 27 of the so attached elements 24. It will be obvious, of course, that an electrode 15' may be incorporated in or omitted from the seal structure as desired. Any suitable or preferred means may be employed for sealing the cathode and anode carrying sections 18 and 19 at the opposite ends of the envelope. These sections 18 and 19 are usually somewhat longer than the envelope sections 17, but they may be sealed to the opposite ends of the envelope by means of connecting rings like the rings 21 or by means of seal structures like the structures 23, in order to facilitate the application of electron guiding and accelerating electrodes at said seals.

Any suitable or preferred envelope sealing structure may, of course, be employed for attaching the cathode and anode elements at the opposite ends of the envelope structure. To this end, both anode and cathode may be supported each upon a corresponding envelope closure member 32. Said closure member, at the cathode mounting end of the envelope, may comprise a plate 33 forming a support for the cathode structure, and sealed conduit channels, through which cathode energizing conductors connected with the cathode, may extend outwardly of the envelope. The closure member 32, at the anode carrying end of the envelope, may comprise a plate 33' formed with an opening in which the tubular anode member 12 is sealingly mounted.

As shown more particularly in FIGS. 11 and 12, the cathode and anode supporting closure members 32 may each provide an annular seat 34 in which a sealing ring 35 is sealingly secured, as by means of a peripheral weld W–1. The seal structure may also include a sleeve-like sealing member 35' of metal readily sealable with glass and having a glass sealing edge 36 adapted to seal with the outwardly facing end edge of an envelope end section 18 or 19, the end of the sleeve member 35' remote from the glass sealing edge 36 being sealed to the ring 35. As shown more particularly in FIG. 11, the sleeve-like sealing member 35' may be formed with an inturned flange 37 at the end thereof remote from its glass sealing edge 36, said inturned flange being sized and shaped to fit upon the ring element 35 in the seat 34. As shown in FIG. 12, the ring 35 may be of sleeve-like configuration having an end formed for engagement in the seat 34 of a supporting member 32, the opposite end of the ring being formed with a seat 38 for seatingly receiving the sealing member 35' at the end thereof remote from the sealing edge 36. In both cases, the end of the sealing member 35' remote from its sealing edge 36 may be sealingly secured to the ring 35, as by means of a peripheral weld W–2.

It will be seen from the foregoing that the present invention, as distinguished from the disclosures of U.S. Letters Patent No. 2,336,774, greatly simplifies and materially reduces the cost of fabricating sectional envelopes for electron flow devices, in that the envelope assembly procedure of the present invention avoids the necessity of applying electron guiding and accelerating electrodes into position through a completed sectional envelope portion of considerable length, from an end thereof. Such assembly procedure is not only clumsy, tedious and time consuming, and in some cases requiring electrode positioning and fastening tools of considerable length, but also is apt to introduce foreign matter, such as small metallic chips, into the otherwise clean envelope section, it being substantially impossible to remove all of such foreign matter from the envelope after electrode assembly therein.

The envelope fabricating procedure of the present invention consists in joining the individual sleeve-like sections of glass at each end to a metal seal ring to form an assembly unit, which may then be stacked upon a like unit for the sealing together of the seal rings at the facing ends of adjacent units. An important advantage is that each individual envelope section with seal rings attached can be individually internally sand blasted to clean the same before assembly. Electrodes can be made by spinning, welding or stamping procedures, and may be assembled between adjacent envelope sections at the time the seal rings are welded together. As a consequence, an exceedingly clean sectional envelope can be fabricated at low cost, such cleanliness being of considerable advantage in the fabrication of high voltage electron accelerators.

The electrodes 15' shown in FIGS. 3–8 may readily be fabricated by forming flanged or beaded edges 16 at the opposite ends of tubular sections, such as may be cut from pre-formed metal pipe of appropriate diameter and wall thickness. Alternately, as shown more especially in FIGS. 13 and 14, electron accelerating electrodes 15'a and 15'b may be formed from metal sheets by metal spinning techniques. In this connection, electrodes 15'a and 15'b with mounting bracket means formed integrally on the electrodes may be produced by spinning a sheet metal plate 39, to form a central sleeve portion having an inwardly curled edge 16' at one end and an outstanding flange 31' forming mounting bracket means at the opposite end of the sleeve portion.

Such an element, as shown in FIG. 14, may be employed as an electron guiding and accelerating electrode in place of the electrodes 15' and mounting brackets 31 shown in FIGS. 3–8, inclusive. As shown more particularly in FIG. 13, a spun electrode element 39 having an integral bracket forming peripheral flange thereon may be employed in conjunction with another spun element 40 secured in back-to-back relationship on the element 39, whereby the bracket forming flange 31' is disposed medially and peripherally of the composite electrode which comprises the sleeve portions 39 and 40, extending on opposite sides of the flange 31' and in coaxial and abutting relationship to form the spun metal electrode 15'a having inwardly curled edges 16' at each of the opposite ends of the electrode.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

[1. The method of making a sectional envelope for an electron flow device which consists in pre-forming a plurality of tubular envelope sections, each having opposite open ends of glass and a seal ring having an outstanding circumferential flange and a sleeve portion having an edge forming a glass-to-metal seal with the glass, at each of said open ends, stacking a pair of said sections one upon the other with the flanges of said seal rings in overlying engagement, applying the outstanding carrying portions of an electrode mounting bracket in position to be held by and between said flanges, and then peripherally sealing said flanges together to sealingly interconnect said sections and to mount said electrode therebetween.]

[2. A sectional envelope structure comprising a pair of tubular envelope components, each having an open end of glass and a seal ring having a sleeve portion terminating in a sealing edge joined with the glass end of each component, said seal rings having each an outstanding circumferential flange, said components being disposed in end-to-end abutting relationship with the flanges of said seal rings in facing engagement, said flanges being sealed together, and an electrode having mounting portions secured by and between said sealed flanges.]

3. A sectional envelope structure comprising a pair of tubular envelope components, each having an open end of glass and a seal ring having a sleeve portion terminating in a sealing edge joined with the glass end of each component, said seal rings having each an outstanding circumferential flange, said components being disposed in end-to-end abutting relationship with the flange of said seal rings in facing engagement, said flanges being sealed together and formed with cooperating seats forming a pocket facing inwardly of said envelope structure, and an electrode carrying mounting having portions secured in said pocket.

4. A sectional envelope structure comprising a pair of tubular envelope components, each having an open end of [glass] *insulating material which is sufficiently rigid to form part of a vacuum tight envelope* and a seal ring having a sleeve portion terminating in a sealing edge joined with [the glass] *said* end of *insulating material of* each component, said seal rings having each an outstanding circumferential flange, said components being disposed in end-to-end abutting relationship with the flanges of said seal rings in facing engagement, said flanges being sealed together and formed with circular grooves forming a circumferential pocket facing inwardly of said envelope structure, and an electrode carrying mounting secured in said pocket.

5. A sectional envelope component comprising a tubular member having opposite end of [glass] *insulating material which is sufficiently rigid to form part of a vacuum tight envelope* and sealing elements mounted at the opposite ends of said tubular member, said sealing elements each embodying a sleeve portion terminating in an edge forming [a glass] *an insulator*-to-metal seal with [a glass] *an* end *of insulating material* of said tubular member, and a separate annular ring portion sealed on the sleeve portion in position forming an outstanding peripheral flange thereon remote from said [glass] *insulator*-to-metal seal, said ring portion having a preshaped recess to define a dimensioned pocket to receive an element of a control electrode to be supported between mated components whereby a plurality of said components may be disposed in stacked end to end abutting relationship, with the flanges of said sealing elements at the abutting ends of a mated pair of said components disposed in mutually overlying engagement, with the rim edges of the flanges readily accessible to permit them to be circumferentially sealed together after assembling with a mating component.

6. A sectional envelope component comprising a tubular member having opposite ends of [glass] *insulating material which is sufficiently rigid to form part of a vacuum tight envelope* and sealing elements mounted at the opposite ends of said member, said elements each having an outstanding peripheral flange and a sleeve portion formed on the flange and terminating in an edge forming [a glass] *an insulator*-to-metal seal with [a glass] *an* end *of insulating material* of said tubular member, whereby a plurality of said components may be disposed in end to end abutting relationship, with the flanges of said sealing elements at the abutting ends of a pair of said components disposed in mutually overlying engagement, and whereby such flanges may be circumferentially sealed together, said flanges being formed with inwardly facing seats adapted to provide a pocket for seatingly receiving and supporting an electrode carrying mounting therein when said flanges are disposed in mutually overlying engagement.

References Cited in the file of this patent or the original patent

UNITED STATES PATENTS

| | | |
|---|---|---|
| 2,336,774 | Brackney | Dec. 14, 1943 |
| 2,432,513 | Depew | Dec. 16, 1947 |
| 2,451,847 | Madden | Oct. 19, 1948 |
| 2,680,209 | Veronda | June 1, 1954 |